(12) United States Patent
Dambietz et al.

(10) Patent No.: US 7,485,807 B2
(45) Date of Patent: Feb. 3, 2009

(54) GAS-INSULATED BUS BAR COMPONENT COMPRISING OUTDOOR BUSHINGS

(75) Inventors: Hans-Peter Dambietz, Berlin (DE); Manfred Meinherz, Berlin (DE)

(73) Assignee: Siemens Aktiengesellschaft, Munich (DE)

(*) Notice: Subject to any disclaimer, the term of this patent is extended or adjusted under 35 U.S.C. 154(b) by 401 days.

(21) Appl. No.: 10/558,746

(22) PCT Filed: Apr. 30, 2004

(86) PCT No.: PCT/DE2004/000991

§ 371 (c)(1),
(2), (4) Date: Dec. 1, 2005

(87) PCT Pub. No.: WO2004/109882

PCT Pub. Date: Dec. 16, 2004

(65) Prior Publication Data

US 2006/0245128 A1 Nov. 2, 2006

(30) Foreign Application Priority Data

Jun. 2, 2003 (DE) .............................. 103 25 682

(51) Int. Cl.
*H02G 5/06* (2006.01)
*H02H 3/00* (2006.01)

(52) U.S. Cl. ................. 174/72 B; 174/71 B; 174/88 B; 174/520; 361/62; 361/600

(58) Field of Classification Search ................. 174/650, 174/11 BH, 16.2, 18, 17 GF, 68.2, 72 B, 174/71 B, 88 B, 70 B, 99 B, 152 G, 153 G, 174/50, 520; 361/600, 601, 62; 16/2.1, 2.2; 218/2, 118, 140

See application file for complete search history.

(56) References Cited

U.S. PATENT DOCUMENTS 3,655,930 A * 4/1972 Frey .............................. 218/2
3,818,281 A * 6/1974 Ferton et al. ................ 361/605

FOREIGN PATENT DOCUMENTS

| CN | 1196589 A | 10/1998 |
|---|---|---|
| DE | 31 41 437 A1 | 5/1982 |
| DE | 31 37 783 A1 | 6/1982 |
| DE | 296 20 438 U1 | 3/1997 |
| DE | 198 56 775 A1 | 6/2000 |
| DE | 101 19 530 A1 | 11/2002 |
| EP | 0 540 131 A1 | 5/1993 |
| EP | 1 174 968 A1 | 1/2002 |

* cited by examiner

*Primary Examiner*—Angel R Estrada
(74) *Attorney, Agent, or Firm*—Laurence A. Greenberg; Werner H. Stemer; Ralph E. Locher

(57) ABSTRACT

The invention relates to a gas-insulated bus bar component comprising a grounded housing that is filled with protective gas and at least one bus bar conductor, which extends in the longitudinal direction of the housing and is supported on said housing by means of insulating bus bar supports. According to the invention, each bus bar conductor is connected to a disconnecting switch that is insulated by protective gas. The aim of the invention is to provide a component of this type, which can be simply connected to and disconnected from an air-insulated conductor, even when operational. To achieve this, the disconnecting switch is located in an outdoor bushing that is fixed to the housing.

13 Claims, 2 Drawing Sheets

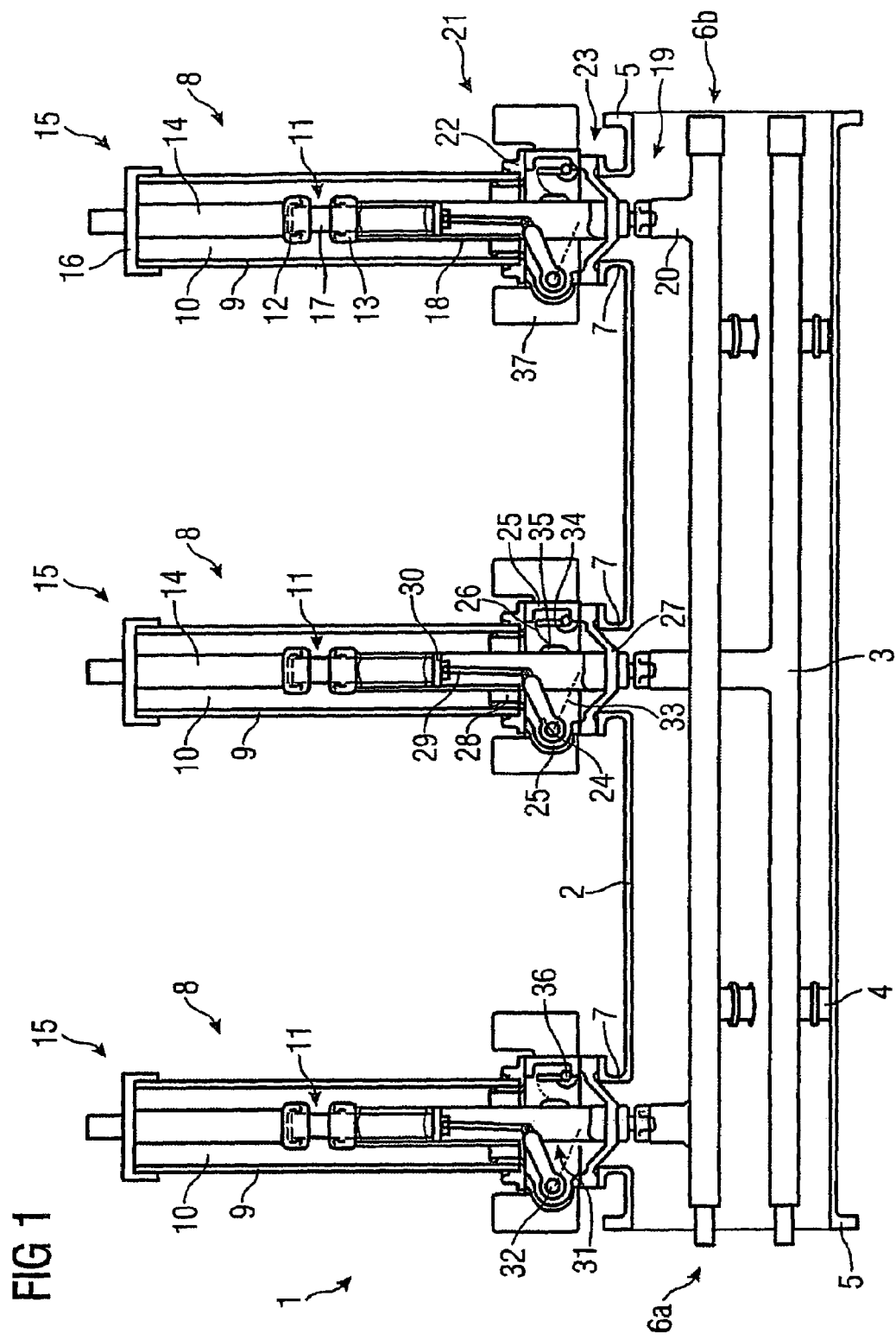

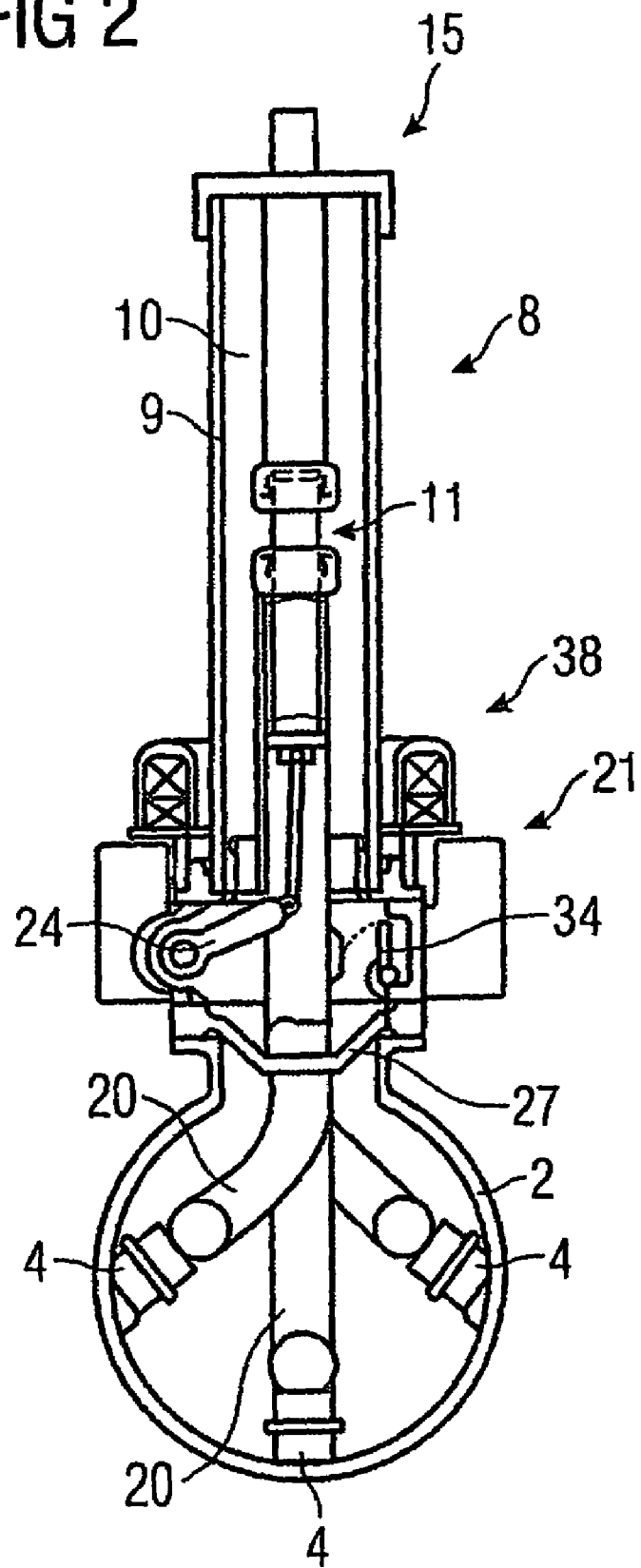

GAS-INSULATED BUS BAR COMPONENT COMPRISING OUTDOOR BUSHINGS

CLAIM FOR PRIORITY

This application is a national stage of PCT/DE2004/000991 which was published on Dec. 16, 2004 and which claims the benefit of priority to German Application No. 103 25 682.2 filed Jun. 2, 2003.

TECHNICAL FIELD OF THE INVENTION

The invention relates to a gas-insulated busbar component having a grounded housing which is filled with protective gas and having at least one busbar conductor which extends in a longitudinal direction in the housing and is supported on the housing via insulating busbar supports, with each busbar conductor being connected to a switch disconnector with protective gas insulation.

BACKGROUND OF THE INVENTION

One such gas-insulated busbar component is known, for example, from DE 101 19 530 A1. A switchgear assembly which is disclosed there is designed for a three-phase power supply system and has two busbars which are routed parallel to one another and are each composed of busbar components whose end faces are connected to one another by means of a gas-tight flange connection. Each busbar component has busbar conductors, which are encapsulated in a three-pole form in a housing, and is filled with an insulating protective gas with a high dielectric strength. The housing, which is at ground potential, is connected in a gas-tight manner via a tubular connecting stub to a switch housing, in which circuit breakers are arranged. Switch disconnectors with protective gas insulation are accommodated in the connecting stub and in each case connect one busbar conductor to one of the circuit breakers in a contact position. Outdoor bushings which are attached to the switch housing are used for connection of the circuit breaker to air-insulated high-voltage lines, with each high-voltage line being connected to the switch disconnector via one of the circuit breakers. The busbar conductors with protective gas insulation in the already known busbar component can thus be electrically connected to the air-insulated lines only via a circuit breaker.

Further busbar components, which have a plurality of encapsulated poles and a single encapsulated pole, are known, by way of example, from DE 31 37 783 and DE 31 41 437 A1.

One object of the invention is to provide a gas-insulated busbar component of the type mentioned initially, which can be connected in a simple manner to an air-insulated conductor, and can be disconnected from it, even in the operating state.

The invention achieves this object in that the switch disconnector is arranged in an outdoor bushing which is attached to the housing.

One or more air-insulated lines can be moved into a protective gas atmosphere, which is contained in the interior of the housing when the busbar component is in the operating state, in a simple manner via the outdoor bushing. In this case, the busbar component is connected in a gas-tight manner to further tubular housings via expedient connecting means such as flange connections, thus resulting in a closed gas area which can be filled with a protective gas such as sulfur hexafluoride.

When the switch disconnector is moved from a contact position, in which current can flow via the switch disconnector, to a disconnected position, in which the current flow is interrupted, an air-insulated line can be disconnected in a simple manner from the busbar conductor associated with it. According to the invention, this thus allows direct movement of a busbar from air insulation into gas insulation. According to the invention, there is no need for any further components or switches. The change in the insulation medium is advantageous, for example, in the case of so-called hybrid switchgear assemblies.

In the preferred exemplary embodiment according to the invention, three busbar conductors are provided, each having an outdoor bushing, with the distances between the outdoor bushings corresponding to the voltage-dependent flashover distance in order to prevent voltage flashovers. A busbar component according to the invention which has been developed further in this way is particularly suitable for three-phase power supply systems.

According to one expedient further development in this context, the outdoor bushings are arranged on a plane. This allows the outdoor bushings to be aligned vertically, with their center of gravity arranged precisely above the housing to which they are fitted, thus simplifying the design of the busbar component.

The outdoor bushings are expediently tubular or hollow-cylindrical. In the case of busbar conductors with a plurality of encapsulated poles, these conductors normally extend parallel to one another in a horizontal direction. Particularly in a situation such as this, it is advantageous for the outdoor bushings to be aligned vertically and for their center of gravity to be located precisely above the busbar, thus improving the stability of the gas-insulated busbar.

In one preferred embodiment of the invention, at least one of the outdoor bushings has a grounding switch. The grounding switch has a grounded switching finger which, in a grounding position, rests on a mating contact which is electrically connected to the busbar conductor. A grounding shaft is expediently provided in order to drive the grounding switch, and is mounted in attachment means in the outdoor bushing. In this case, the grounding shaft is, for example, driven by motor or by hand.

Each switch disconnector is advantageously held in the outdoor bushing by holding means composed of dielectric material. The holding means ensure that the switch disconnector is held in the outdoor bushing independently of the busbar conductor. This allows the outdoor bushing to be produced as an independent component together with the switch disconnector and to be connected in situ to the housing and to the busbar conductor, for example via an expedient plug-in contact. The plug-in contact or any other connection between the switch disconnector and the busbar conductor provide additional retention for the switch disconnector, and increase the stability of the switch disconnector.

The holding means are advantageously gas-tight. By way of example, a bulkhead bushing may be used as a gas-tight holding means, and bounds a disconnector gas area that is formed in the outdoor bushing. In this case, a connecting conductor which is electrically connected to the switch disconnector passes through the center of the bulkhead bushing, and is connected in a gas-tight manner to the bulkhead bushing via expedient sealing means. The disconnector gas area thus forms a gas area which is independent of the busbar area that is bounded by the housing, and can be filled, for example, with a different gas or can have a different pressure applied to it.

In contrast to this, the holding means are gas-permeable, so that a common gas area is formed by the interior of the outdoor bushing and its housing interior in the operating state and can be checked for leaks after final installation of the gas-insulated busbar component into an expedient installation, by means of a joint leak test. By way of example, a post insulator is suitable for use as the gas-permeable holding means.

The switch disconnector advantageously has contact pieces whose end faces are opposite one another, in which case the switch disconnector can be moved by the initiation of a linear movement from a contact position, which allows current to flow, to a disconnected position, in which an electrically isolating gap is formed between the contact pieces. According to this expedient further development of the invention, the design of the switch disconnector is very largely matched to a homogeneous cylindrical conductor which extends in an axial direction, so that it is possible to make use of experiences with conventional outdoor bushings which do not have any switch disconnectors in their interior. This applies both to their design and to the material that is used.

The switch disconnector expediently has a fixed-position female contact as well as a sliding contact which is firmly supported on attachment means of the outdoor bushing via a hollow connecting rod, with a switching pin whose movement is guided by the sliding contact being provided in order to make contact with the female contact, and the female contact is driven via drive means which are arranged in the connecting conductor. The drive means which are arranged in the hollow connecting conductor, for example coupling rods, pivoting levers or the like, are encapsulated by this conductor, thus avoiding voltage peaks at edges and corners of the drive means, and thus partial discharges, even during a drive movement. Furthermore, the switch disconnector has two stationary contact pieces, which can be held in a simple manner. This avoids a complex moving bearing for a contact piece on the attachment means.

In a further expedient refinement of the invention, at least one disconnector shaft is provided for introduction of a drive movement to the switch disconnector. In this case, each disconnector shaft is mounted by means of an expedient rotating bearing in attachment means in the outdoor bushing, with expedient sealing means ensuring gas-tight bushing of the disconnector shaft, for example through the outer wall of the attachment means of the outdoor bushing. The disconnector shaft can, of course, also be mounted in a gas-tight manner in the housing. The drive movement according to this embodiment of the invention can be introduced via a rotary movement into the interior of the outdoor bushing, which is gas-insulated during operation.

According to one expedient further development, an isolating rocker, which is composed of a dielectric material, is provided for introduction of a drive movement. The isolating rocker is mechanically connected, for example, to a coupling rod which forms a switching pin at its end remote from the isolating rocker, which switching pin produces the conductive connection between the contact pieces in the switch disconnector when the latter is in a contact position. The isolating rocker converts a rotary movement as a drive movement to a linear movement, and introduces a translational movement into the switch disconnector, which is designed in a corresponding manner to a push switch.

Each outdoor bushing is advantageously equipped with a current transformer. The secondary of the current transformer is connected to the grounded housing and may be in the form of a current adaptor so that there is no need to open the common or the separate gas areas when it becomes necessary to replace the current adapter.

Field control elements are expediently provided in order to avoid partial discharges in the outdoor bushing.

Furthermore, a display element may be advantageous in order to indicate the position of the switch disconnector.

At least one drive unit, which is supported on the outdoor bushing, is advantageously provided in order to produce a drive movement. This allows the outdoor bushing to be produced as a ready-to-use individual component, independently of the housing. A drive unit can drive either the switch disconnector of one pole, or else the switch disconnectors of all of the poles.

BRIEF DESCRIPTION OF THE DRAWINGS

Further expedient refinements and advantages of the invention are the subject matter of the following description of the exemplary embodiments of the invention with reference to the figures of the drawing, in which identical reference symbols refer to components having the same effect, and in which:

FIG. 1 shows one exemplary embodiment of the gas-insulated busbar component, in the form of a sectioned side view, and FIG. 2 shows the gas-insulated busbar component as shown in FIG. 1, in the form of a longitudinal section.

DETAILED DESCRIPTION OF THE INVENTION

FIG. 1 shows one exemplary embodiment of the gas-insulated busbar component 1 according to the invention, in the form of a longitudinal section. The busbar component 1 shown there has an encapsulated housing 2 which is at ground potential and is essentially tubular and hollow-cylindrical. Busbar conductors 3 extend in the longitudinal direction in the interior of the housing 2 and are held in the housing 2 by means of a post insulator, which is manufactured from a dielectric material and is not illustrated. Connecting flanges 5 can be seen at the end of the housing 2, by means of which the housing 2 can be connected in a gas-tight manner to further tubular housing components to form a closed gas area. The busbar conductors 3 are equipped with plug-in contacts 6a, 6b at the ends for electrical connection, in which case the connecting pin of the plug-in contact which is annotated 6a can be inserted, in order to make contact, into the recess, which is annotated 6b, in a correspondingly designed connecting component.

Furthermore, connecting stubs 7 are integrally formed on the housing 2 and are each intended for gas-tight connection to an outdoor bushing 8.

The outdoor bushing 8 has a hollow-cylindrical insulator 9 with a cavity 10 for holding a switch disconnector 11. The switch disconnector 11 comprises a fixed-position female contact 12 as well as a sliding contact 13, which is likewise in a fixed position, with the female contact 12 being connected via a contact rod 14 to an outdoor connection 15 for connection of an air-insulated high-voltage line. The outdoor connection 15 is arranged at the end of the insulator 9 and has a closure cap 16 which is connected in a gas-tight manner to the insulator 9 by means of adhesives, and closes the cavity 10 in the insulator 9 in a gas-tight manner.

A switching pin 17 is guided such that it can move in the sliding contact 13, with the sliding contact 13 being electrically connected to the busbar conductor 3 via a hollow connecting conductor 18, a plug-in contact 19 arranged in the housing 2, and a lateral connecting stub 20. In this case, the lateral connecting stub 20 is integrally formed on the busbar conductor 3. In other words, the contact rod 14, the female contact 12, the switching pin 17, the sliding contact 13, the connecting conductor 18, the plug-in contact 19 and the lateral connecting stub 20 form a conductive connection between the outdoor connection 15 and the respective busbar conductor 3 when the switch disconnector 11 is in a contact position, in which the switching pin 17 has been moved into the female contact 12.

At the end of the insulator 9 remote from the outdoor connection 15, the outdoor bushing 8 has attachment means 21 which are produced from a metallic material, for example aluminum, and a flange section 22, which is adhesively bonded to the insulator 9, as well as an intermediate housing 23. The attachment means 21 are likewise tubular and have a straight profile in the direction of the longitudinal extent of the insulator 9. The intermediate housing 23 is firmly screwed to the connecting stub 7 via a flange connection, with sealing means which cannot be seen here that are not identified ensuring a gas-tight connection between the outdoor bushing 8 and the housing 2.

An electrically non-conductive isolating rocker 24 is arranged in the intermediate housing 23 in order to initiate a switching movement into the switching pin 17, with side holding caps 25 being provided for gas-tight closure of an intermediate cavity 26, which is bounded by the intermediate housing 23. The intermediate cavity 26 enlarges the cavity 10.

A gas-tight bulkhead bushing 27 is provided as a holding means or holder for holding the sliding contact 13 over the connecting conductor 18, and is mounted in a fixed position between the intermediate housing 23 and the grounded connecting stub 7. In this case, the connecting rod 18 passes centrally through the bulkhead bushing 27, with sealing means, which cannot be seen in FIG. 1, ensuring a gas-tight connection between the connecting rod 18 and the bulkhead bushing 27. In this way, the cavity 10 forms a separate, gas-tight gas area, which can be filled with quenching or insulating gas, for example sulfur hexafluoride.

The bulkhead bushing 27 is produced from a dielectric material, such as cast resin.

The outdoor connection 15 is intended for connection of an air-insulated high-voltage line while, in contrast, the housing 2 is at ground potential. In order to avoid voltage peaks caused by high electric field strengths and corners and edges of the attachment means 21, field control elements 28 are provided, and are electrically connected to the attachment means 21 and to the housing 2.

A coupling rod 29 is provided in order to transmit the drive movement from the isolating rocker 24 to the switching pin 17, is articulated on the isolating rocker 24, and is connected firmly to the switching pin 17 via a switching pin guide 30 at its end remote from the isolating rocker 24. As can be seen, the switching pin 17 and the switching pin guide 30 are arranged within the hollow connecting conductor 18, which for this reason is used as a guide means in addition to forming a purely electrical connection. In order to allow movement of the isolating rocker 24, the connecting conductor 18 has a side opening 31, opposite the isolating rocker 24.

The isolating rocker 24 is also connected in a rotationally fixed manner to a disconnector shaft 32, which is passed out of the intermediate housing 23 via an expedient rotating bearing, which is equipped with sealing means. Rotation of the disconnector shaft 32 moves the isolating rocker 24 to a disconnected position 33, which is indicated in FIG. 1 and in which the switching pin 17 has been moved out of the female contact 12, so that an isolating gap is formed between the female contact 12 and the sliding contact 13.

Furthermore, a grounding switch 34 can be seen on the holding cap 25 and opposite the isolating rocker 24, and is intended for grounding the transmission side of the switch disconnector 17 after opening of the switch disconnector 17. For this purpose, the grounding switch 34 produces a conductive connection between a ground contact 35, which is at the same potential as the connecting conductor 18, and the housing 2, which is at ground potential. A grounding shaft 36, which is passed out of the intermediate housing 23, is provided for driving the grounding switch 34. Furthermore, a drive box 37 for accommodation of drive units is attached to the intermediate housing 23. The drive units are designed to produce a drive movement for the disconnector shaft 32 and for the grounding shaft 36.

FIG. 2 shows a further exemplary embodiment of the gas-insulating busbar component 1 according to the invention, in the form of a cross-sectional view. This view shows that the lateral connecting stubs 20 via which the busbar conductors 3 are each connected to one switch disconnector 11 are different, and are formed differently in the housing 2, depending on the position of the respective busbar conductor 3. In this case, the outdoor bushings 8 are arranged on one plane and at right angles above the housing 2, so that only one outdoor bushing 8 can be seen in the view in FIG. 2.

Furthermore, the outdoor bushing 8 has a current adapter 38, whose secondary is connected to the attachment means 21, which are at ground potential. The current adapter 38 can, for example, be removed for maintenance and can be replaced without opening up the gas area 10 or removing the outdoor bushing 8 from the housing 2.

What is claimed is:

1. A gas-insulated busbar component, comprising:
   a grounded housing filled with a protective gas;
   three busbar conductors extending in a longitudinal direction in said grounded housing, and three outdoor bushings, each of said three busbar conductors being associated with one of said three outdoor bushings, said three outdoor bushings being arranged on a plane, with the distances between the outdoor bushings corresponding to the voltage-dependent flashover distance in order to prevent voltage flashovers;
   said grounded housing additionally including insulating busbar supports therein, each busbar conductor being supported on the housing by said insulating busbar supports;
   each busbar conductor being connected to a switch disconnector containing a protective gas insulation; and said switch disconnector being arranged in an outdoor bushing attached to said grounded housing.

2. The gas-insulated busbar component of claim 1, wherein said outdoor bushing includes a grounding switch.

3. The gas-insulated busbar component of claim 1, wherein said switch disconnector is held in the outdoor bushing by a holding device containing a dielectric material.

4. The gas-insulated busbar component of claim 3, wherein said holding device is gas-tight.

5. The gas-insulated busbar component of claim 3, wherein said holding device is gas-permeable.

6. The gas-insulated busbar component of claim 1, wherein said switch disconnector has contact pieces whose end faces are opposite one another, in which case said switch disconnector can be moved by the initiation of a linear movement from a contact position, which allows current to flow, to a disconnected position, in which an electrically isolating gap is formed between said contact pieces.

7. The gas-insulated busbar component of claim 6, wherein said switch disconnector includes a fixed-position female contact, as well as, a sliding contact that is firmly supported on attachment area of the outdoor bushing via a hollow connecting rod, with a switching pin whose movement is guided by the sliding contact being provided in order to make contact with the female contact, and the female contact is driven by drive means arranged in the connecting conductor.

8. The gas-insulated busbar component of claim 1, further including at least one disconnector shaft for introduction of a drive movement to said switch disconnector, with each disconnector shaft being mounted in an attachment area in the outdoor bushing.

9. The gas-insulated busbar component of claim 1, further including an isolating rocker including a dielectric material, for introduction of a drive movement to said switch disconnector.

10. The gas-insulated busbar component of claim 1, further including field control elements for preventing partial discharges in the outdoor bushing.

11. The gas-insulated busbar component of claim 1, further including a display element for indication of the position of the switch disconnector.

12. The gas-insulated busbar component of claim 1, wherein each outdoor bushing is equipped with a current transformer.

13. The gas-insulated busbar component of claim 1, further including at least one drive unit supported on said outdoor bushing being provided to produce a drive movement, which can be introduced to said switch disconnector for one phase or to a plurality of switch disconnectors for all of the phases.

* * * * *